March 14, 1939. W. J. MADDEN 2,150,449
AIR CONDITIONING APPARATUS FOR PASSENGER CARS
Filed Feb. 26, 1937 5 Sheets-Sheet 1
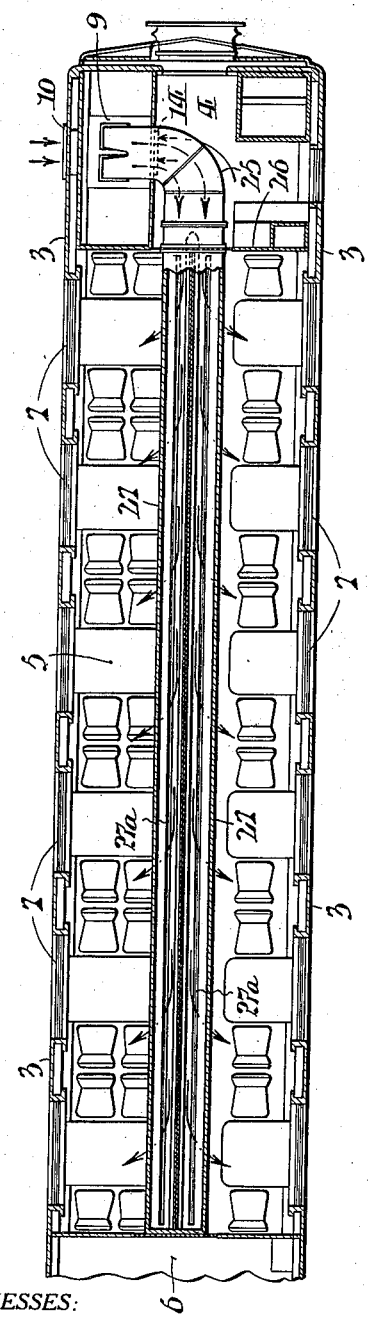
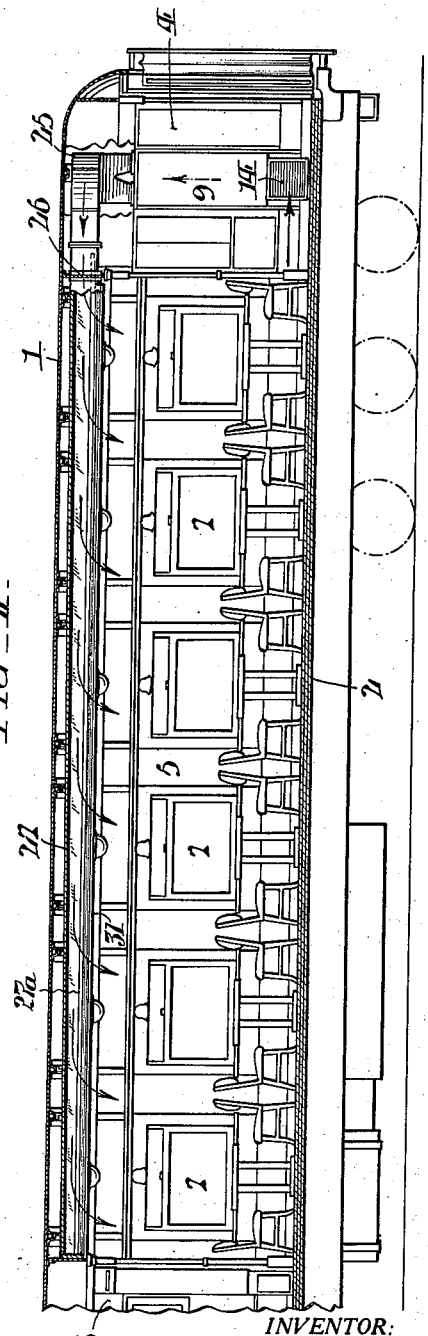
INVENTOR:
William J. Madden,

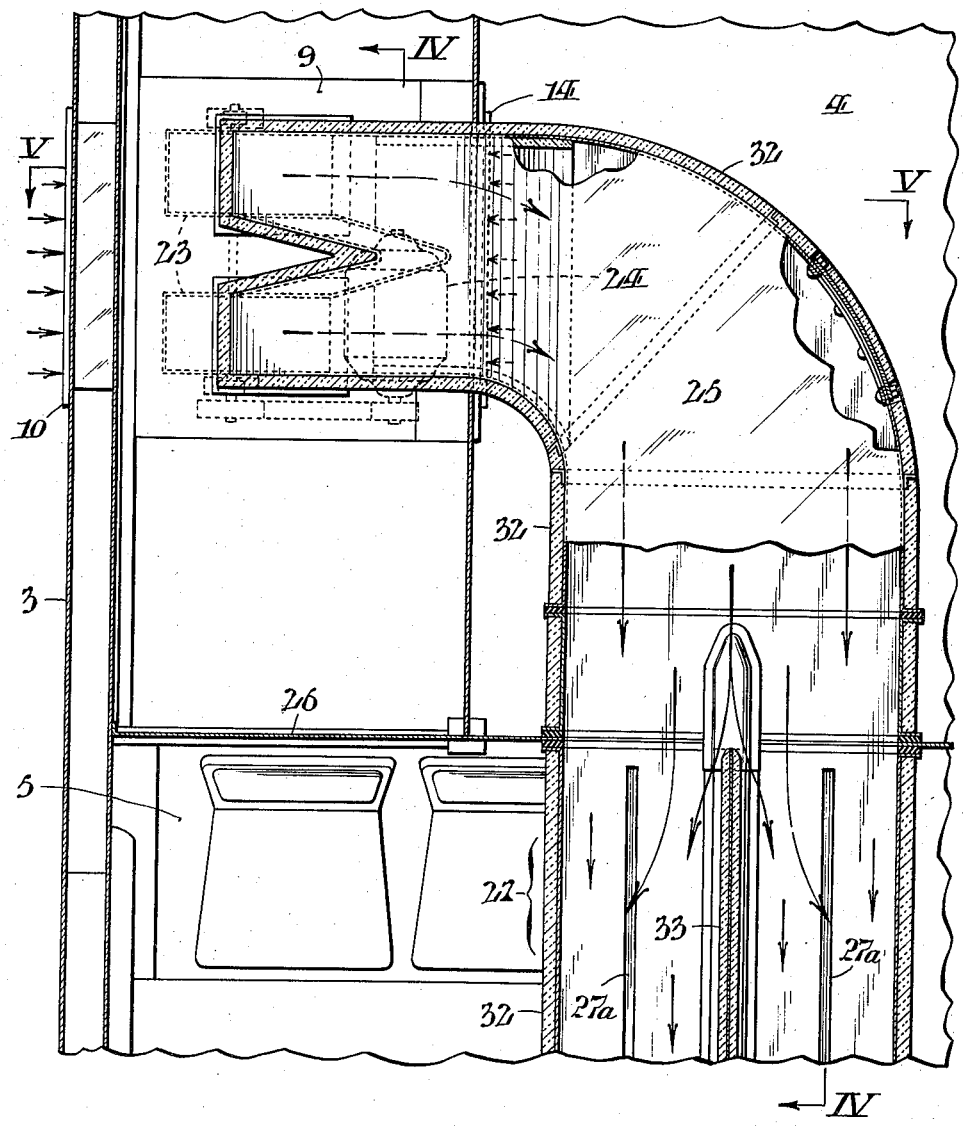

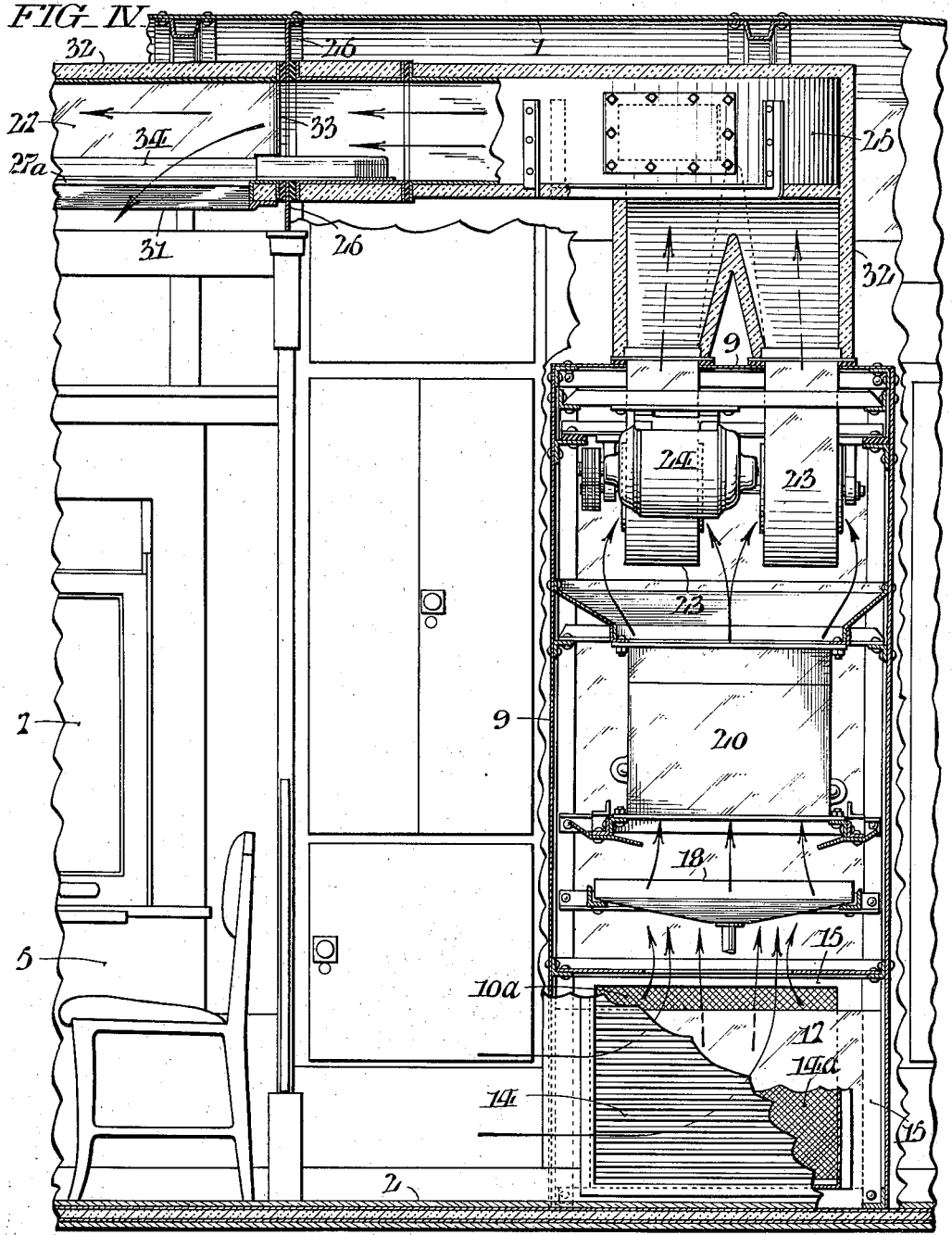

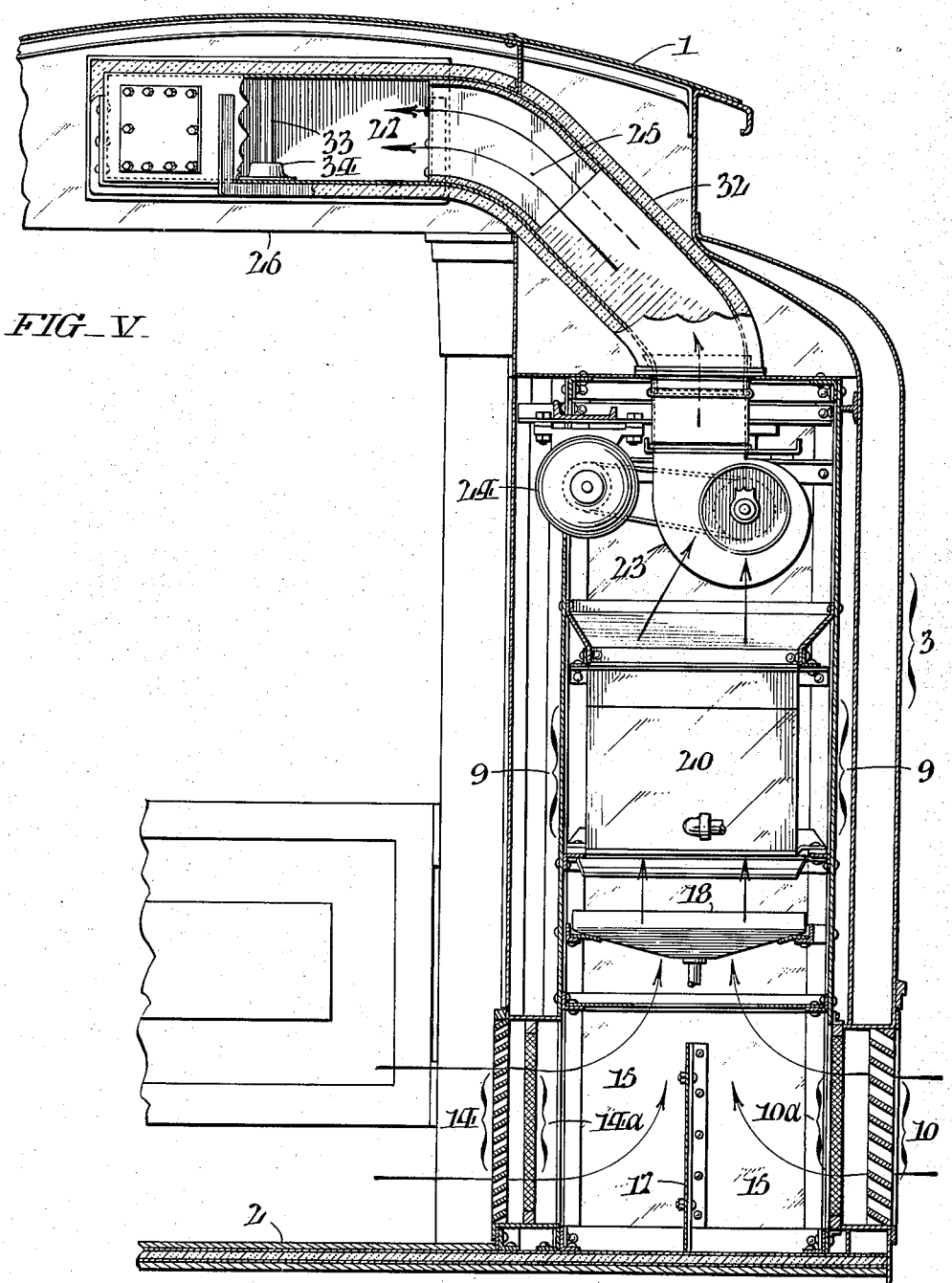

March 14, 1939.   W. J. MADDEN   2,150,449
AIR CONDITIONING APPARATUS FOR PASSENGER CARS
Filed Feb. 26, 1937   5 Sheets-Sheet 5
FIG. VI.
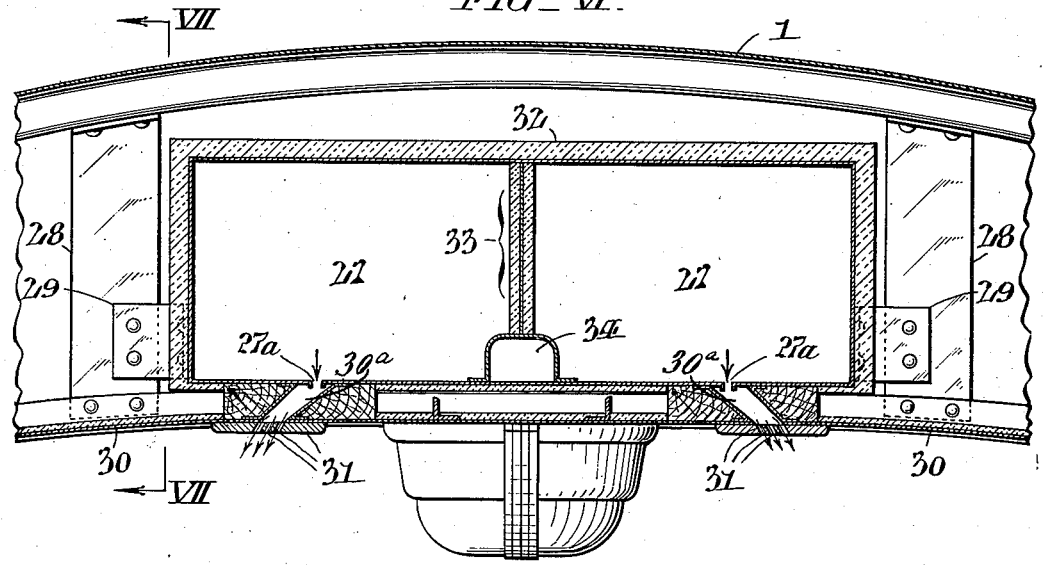
FIG. VII.
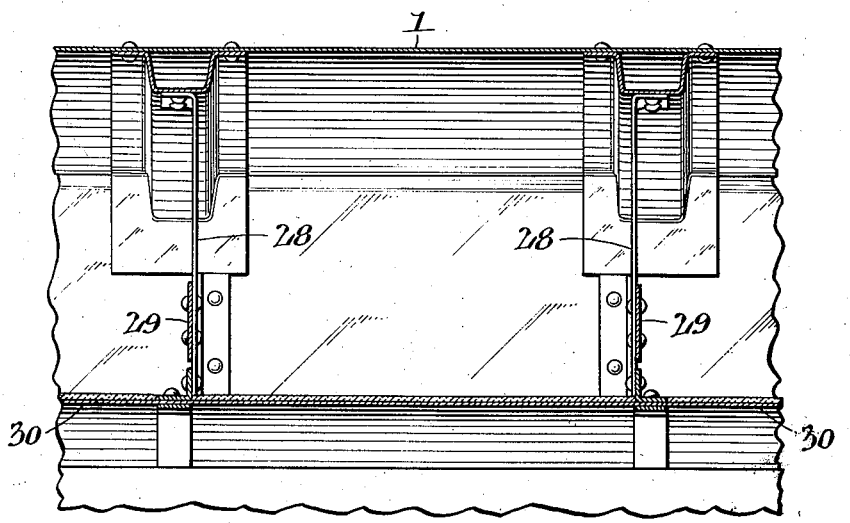
WITNESSES:
John A. Weidler
Woodrow Stevenson
INVENTOR:
William J. Madden,
BY Fraley Paul
ATTORNEYS.

Patented Mar. 14, 1939

2,150,449

UNITED STATES PATENT OFFICE 2,150,449

AIR CONDITIONING APPARATUS FOR PASSENGER CARS

William J. Madden, Lansdowne, Pa., assignor to The Pennsylvania Railroad Company, Philadelphia, Pa., a corporation of Pennsylvania Application February 26, 1937, Serial No. 127,827

5 Claims. (Cl. 98—14)

This invention relates to air conditioning systems for railway passenger cars and more particularly to the discharge and distributing of the conditioned air into the passenger occupied space of the car.

The proper distribution of the conditioned air in such a confined and limited space as that of a passenger car is materially affected by the efficiency of the air condition system as a whole. The main object of this invention is to provide a means for insuring an even distribution of the conditioned air both longitudinally and transversely of the passenger cars. Another object is the avoidance of drafts and the falling of the discharged air directly on the passengers. Compactness, simplicity and economical construction are also objects of my invention. Still further objects and advantages will become apparent from the following detailed description of my invention, reference being had to the accompanying drawings.

Fig. I of the drawings represents a longitudinal sectional plan view of a portion of a railway passenger car embodying my invention.

Fig. II is a longitudinal sectional side view of same.

Fig. III is a partial top view of the air conditioning apparatus showing only the supply end of the distribution duct.

Fig. IV is a vertical section taken about the lines IV—IV of Fig. III.

Fig. V is a vertical section taken about the lines V—V of Fig. III.

Fig. VI is a transverse sectional view of the distribution duct showing its installation in the car roof.

Fig. VII is a vertical sectional view taken about the lines VII—VII of Fig. VI.

My invention is primarily concerned with the distribution duct, and the air conditioning apparatus proper is the subject of a separate application for a United States patent by William J. Madden, filed March 9, 1936, Serial No. 67,803, now Patent No. 2,084,155, granted June 15, 1937. A detailed description of the air conditioning apparatus proper and its operation is therefore avoided herein for the sake of clarity. This invention is in a sense a further development of the invention just referred to.

In the drawings there is shown the passenger occupied portion of a conventional dining car equipped with my invention. It will be understood that the invention is equally applicable to many other forms of passenger carrying cars and is not restricted to the specific type chosen for illustration herein. The car body comprises, generally, a roof 1, a floor 2, and side walls 3, a passageway 4, a passenger space 5 and a kitchen space 6. The car includes windows 7, preferably having double sashes, the windows being kept closed in order to establish a substantially closed system with controlled admission of quantities of fresh conditioned air.

The air conditioning apparatus proper is housed in a small cabinet 9 at the end of the car adjacent the passenger space 5. This cabinet 9 is relatively narrow in the direction of the longitudinal axis of the car, and is nested between linen-lockers which ordinarily fill that pocket of the vestibule between the passageway 4 and one side wall 3 of the car. This cabinet 9 has near the base thereof an intake 10 situated at the side wall of the car and adapted to admit fresh air from the exterior, and an intake 14 situated at the central passageway 4 and adapted to receive air withdrawn from the passenger space 5. Associated with each intake 10, 14, there is a filter 10a, 14a which serves to clean air passing therethrough.

At the base of the body 9 is a mixing chamber 15 having a centrally placed baffle 17 for deflecting the incoming air upward in the manner clearly illustrated in Fig. V. The inlet openings of the intakes 10 and 14 are also inclined upwardly for the same purpose. A horizontally disposed tray or drip-pan 18 is positioned in the body 9 above the baffle 17 and serves also as a deflecting baffle as explained in the above identified patent application.

Above the tray 18 is positioned an air conditioning unit 20 for conditioning the air. This unit 20 may be of any convenient form as explained in the above identified patent application. Above this conditioning unit 20 are a pair of blowers 23 driven by a constant speed electric motor 24. At the discharge sides of the blowers 23 there is provided a duct 25 which leads from the upper region of the compartment 8 through the monitor deck, diagonally to the transverse bulkhead 26 where it discharges into a distribution duct 27.

The distribution duct 27 runs longitudinally of the car along the central part of the roof 1 to which it is attached by brackets 28 and 29. A ceiling 30 hides the distribution duct 27 from view and continuous discharge or air delivery slots 30a in the ceiling wall with grilles 31 at their mouths conduct the air through the ceiling 30 into the passenger space 5. The ducts 25 and 27 are covered with an insulation 32 as indicated in the drawings. The distribution duct 27 gradually tapers at its top side toward the end remote from the conditioning unit 20, and this feature is of prime importance. This tapering is desirable because of the fact that, if a uniform cross-sectional area is utilized, the most of the air will be discharged at the end of the duct 27 remote from the conditioning unit 20. This tapering also results in an even distribution of the air into the passenger space 5 in a longitudinal direction instead of an over-discharge at one end and an under-discharge at the other end. The bottom of the duct 27 has two continuous slots 27a positioned to discharge a high velocity jet of conditioned air against the inclined side of the outlet slot 30a, thereby creating a turbulence in the outlet slot 30a which is conducive to a thorough mixing of the conditioned air and room air as the air leaves the grilles 31. These slots 27a have flanges along their edges to aid in directing the discharging air toward the inclined surfaces of the slots 30a.

The duct 27 has a vertical central partition 33 running its full length and this partition 33 in conjunction with the outwardly inclined slots 30a and grilles 31 bring about a uniform transverse distribution of the air. Thus air is admitted into the car in two continuous longitudinal streams at the ceiling of the car, which are directed downward and outward toward the car sides, to the exclusion of the walking space of the car aisle. Being continuous, these streams can be gentle, so as to be lost by intermixture with the rest of the air before reaching the level of the heads of seated passengers. The narrow duct-slots 27a opening into the wider wall-slots 30a assure gentle (but turbulent) streams issuing from the grilles 31. The partition equalizes the discharge of the pair of closely spaced slots 30a, because each slot of the pair is fed by a feed duct which is separated from the duct feeding the other slot 30a of the pair, and there is no tendency for one slot 30a to over-discharge at the expense of its associated slot 30a. The inclination of the vanes forming the grilles 31 also makes for even discharge and prevents the air from falling out directly on the passengers. The conditioned air in the distribution duct 27 impinges on the inclined surface of the slot 30a which forms a duct-like connection between duct 27 and the grille 31, and this provides a controlled discharge under the constant pressure of the blowers 23 and avoids having the air drop out of the grilles 31 in an uncontrolled manner. It should be noted that the sides of the duct-like slots 30a converge. Drafts are avoided in this controlled manner of discharge. At the bottom of the duct 27 is formed a duct 34 for accommodating the electrical wires for lighting or control.

It will be noted that my invention is characterized by a system of baffles and controls from the guided intakes 10, 14 to the guided discharges through the grilles 31. The constant speed blower 23 distributes uniformly conditioned air from one end of the passenger space 5 to the other without setting up drafts to annoy the passengers. This regulated condition cannot be disturbed by a heavy side wind blowing into the intake 10 because of the provision of a baffle 17 and inclined inlet openings to prevent this occurring. There is no sudden influx of air directly opposing the current of air from the opposite inlet to upset the air conditioning, and maldistribution of air is avoided in the passenger occupied space 5. The system functions efficiently and is economic in installation. The system of baffles and the tapering distribution duct cooperate throughout the apparatus to provide a balanced and uniform air conditioning which is superior to anything known to me.

While I have described the preferred form of my invention in some detail, it will be apparent to one skilled in the art that various modifications and changes can be made without departing from the spirit of my invention as hereinafter claimed.

Having thus described my invention, I claim:

1. In a passenger car having air conditioning means and blowing means for moving air in contact with said air conditioning means and blowing it into the passenger space of the car, a distribution duct receiving the conditioned air and extending along over the longitudinal aisle of the car, with a substantially continuous longitudinal discharge slot sloping downward and directing the conditioned air from said duct in a continuous gentle stream downward and outward toward the car side, to the exclusion of the walking space of said longitudinal aisle, said duct tapering toward its end remote from that where it receives the conditioned air, so as to give substantially uniform distribution of conditioned air lengthwise of the car.

2. The invention as set forth in claim 1, further characterized by the fact that the discharge slot is provided with a grille of longitudinal vanes sloping downward and outward, and thus directing the issuing air toward the car side and away from the said aisle space.

3. The invention as set forth in claim 1 further characterized by the fact that besides substantially continuous longitudinal discharge slots discharging and directing the conditioned air from said duct downward and outward in continuous gentle streams toward both sides of the car, to the exclusion of the walking space of said longitudinal aisle, said longitudinal discharge duct has a central longitudinal septum between the slots that discharge toward opposite sides of the car, for assuring substantially equal division of conditioned air between the two sides of the car.

4. In a passenger car having air conditioning means and blowing means for moving air in contact with said air-conditioning means and blowing it into the passenger space of the car, a distribution duct receiving the conditioned air and extending along behind a wall of said passenger space, said wall having a substantially continuous air delivery slot therein with inclined sides, and said duct having in its wall a substantially continuous relatively narrow discharge slot extending along said wall slot and formed to direct the discharging air against an inclined side of the latter, whereby an eddying or turbulence of the air in and issuing from said wall slot is created, so as to quicken and improve the intermixture of this issuing conditioned air with the air in the passenger space of the car.

5. The invention as set forth in claim 4 further characterized by the fact that the mouth of the air delivery slot is provided with a discharge grille substantially flush with the ceiling over the passenger space of the car.

WILLIAM J. MADDEN.